(12) United States Patent
Spahlinger (10) Patent No.: US 7,805,993 B2
(45) Date of Patent: Oct. 5, 2010

(54) OPERATING METHOD FOR A CORIOLIS GYRO, AND EVALUATION/CONTROL ELECTRONICS WHICH ARE SUITABLE FOR THIS PURPOSE

(75) Inventor: Guenter Spahlinger, Stuttgart (DE)

(73) Assignee: LITEF GmbH, Freiburg (DE)

( * ) Notice: Subject to any disclaimer, the term of this patent is extended or adjusted under 35 U.S.C. 154(b) by 1069 days.

(21) Appl. No.: 10/555,737

(22) PCT Filed: May 6, 2004

(86) PCT No.: PCT/EP2004/004844

§ 371 (c)(1),
(2), (4) Date: Nov. 7, 2005

(87) PCT Pub. No.: WO2004/099716

PCT Pub. Date: Nov. 18, 2004

(65) Prior Publication Data

US 2006/0250194 A1    Nov. 9, 2006

(30) Foreign Application Priority Data

May 8, 2003   (DE) .............................. 103 20 675

(51) Int. Cl.
*G01P 9/04*   (2006.01)
*G01C 19/56*   (2006.01)
(52) U.S. Cl. ................. 73/504.02; 73/504.13; 702/145
(58) Field of Classification Search .............. 73/504.02, 73/504.04, 504.12, 504.13, 504.11; 702/145
See application file for complete search history.

(56) References Cited

U.S. PATENT DOCUMENTS

| 3,642,334 | A | | 2/1972 | Atkinson |
| 3,917,928 | A | | 11/1975 | Wesner |
| 4,222,270 | A | * | 9/1980 | Allen ....................... 73/504.11 |
| 5,983,719 | A | * | 11/1999 | Matthews et al. ........ 73/504.13 |
| 5,992,233 | A | | 11/1999 | Clark |
| 6,121,910 | A | * | 9/2000 | Khoury et al. .............. 341/143 |
| 6,255,760 | B1 | | 7/2001 | Hasegawa et al. |
| 7,034,727 | B2 | * | 4/2006 | Xu ............................. 341/143 |
| 2007/0019744 | A1 | * | 1/2007 | Spahlinger .................. 375/242 |

FOREIGN PATENT DOCUMENTS

| DE | 19635923 | 2/1998 |
| DE | 19739903 | 4/1999 |
| EP | 1072893 | 1/2001 |
| WO | 03090363 | 11/2003 |

* cited by examiner

*Primary Examiner*—Helen C. Kwok
(74) *Attorney, Agent, or Firm*—Elliott N. Kramsky (57) ABSTRACT

An operating method for a Coriolis gyro. Digital read signals are produced that represent a measure of the instantaneous amplitudes/frequencies of the stimulation oscillation/read oscillation of the gyro resonator. Force signals are applied to the resonator. The force signals are controlled as a function of the digital read signals so that the stimulation oscillation/read oscillation assume specific amplitudes/frequencies. The force signals are produced from quantized output signals from a pulse modulator. The modulator is fed with digital stimulation/compensation signals derived from the digital read signals.

8 Claims, 8 Drawing Sheets

OPERATING METHOD FOR A CORIOLIS GYRO, AND EVALUATION/CONTROL ELECTRONICS WHICH ARE SUITABLE FOR THIS PURPOSE

BACKGROUND

1. Field of the Invention

The present invention relates to Coriolis gyros. More particularly, the invention pertains to an operating method for a Coriolis gyro and to suitable evaluation/control electronics.

2. Description of the Prior Art

Coriolis gyros (also referred to as vibration gyros) are in increasing use for navigation. They include a mass system that is caused to oscillate with the oscillation generally being a superimposition of a large number of individual oscillations.

The individual oscillations of the mass system are initially independent of one another, and may be regarded in abstract form as "resonators". At least two resonators are required for operation of a vibration gyro; one ("first resonator") is artificially stimulated to oscillate, with these oscillations being referred to below as a "stimulation oscillation". The other ("second resonator") is stimulated to oscillate only when the vibration gyro is moved/rotated. This is because Coriolis forces occur in this case that couple the first resonator to the second resonator, extract energy from the stimulation oscillation of the first resonator, and transmit it to the read oscillation of the second resonator. The oscillation of the second resonator is referred to below as the "read oscillation".

In order to determine movements (in particular rotations) of the Coriolis gyro, the read oscillation is tapped off and the corresponding read signal (e.g., the read oscillation tapped-off signal) is investigated to determine whether any changes have occurred in the amplitude of the read oscillation as they represent a measure of rotation of the Coriolis gyro.

Coriolis gyros may be in the form of either an open-loop or a closed-loop system. In a closed-loop system, the amplitude of the read oscillation is continuously reset to a fixed value (preferably zero) by respective control loops. An example of a closed-loop version of a Coriolis gyro will be described below in conjunction with FIG. 2 to illustrate the method of operation of a Coriolis gyro. The gyro 1 includes a mass system 2 that can be caused to oscillate and is also referred to below as a "resonator". (A distinction exists between this expression and the abstract "resonators" term previously employed for individual oscillations of the "real" resonator.) As mentioned, the resonator 2 may be considered as a system of two "resonators" (a first resonator 3 and a second resonator 4). The first and second resonators 3, 4 are coupled to a force transmitter (not shown) and to a tapping-off system (not shown). The noise produced by the force transmitter and the tapping-off systems is indicated schematically by Noise1 (reference symbol 5) and Noise2 (reference symbol 6).

Figure 2:
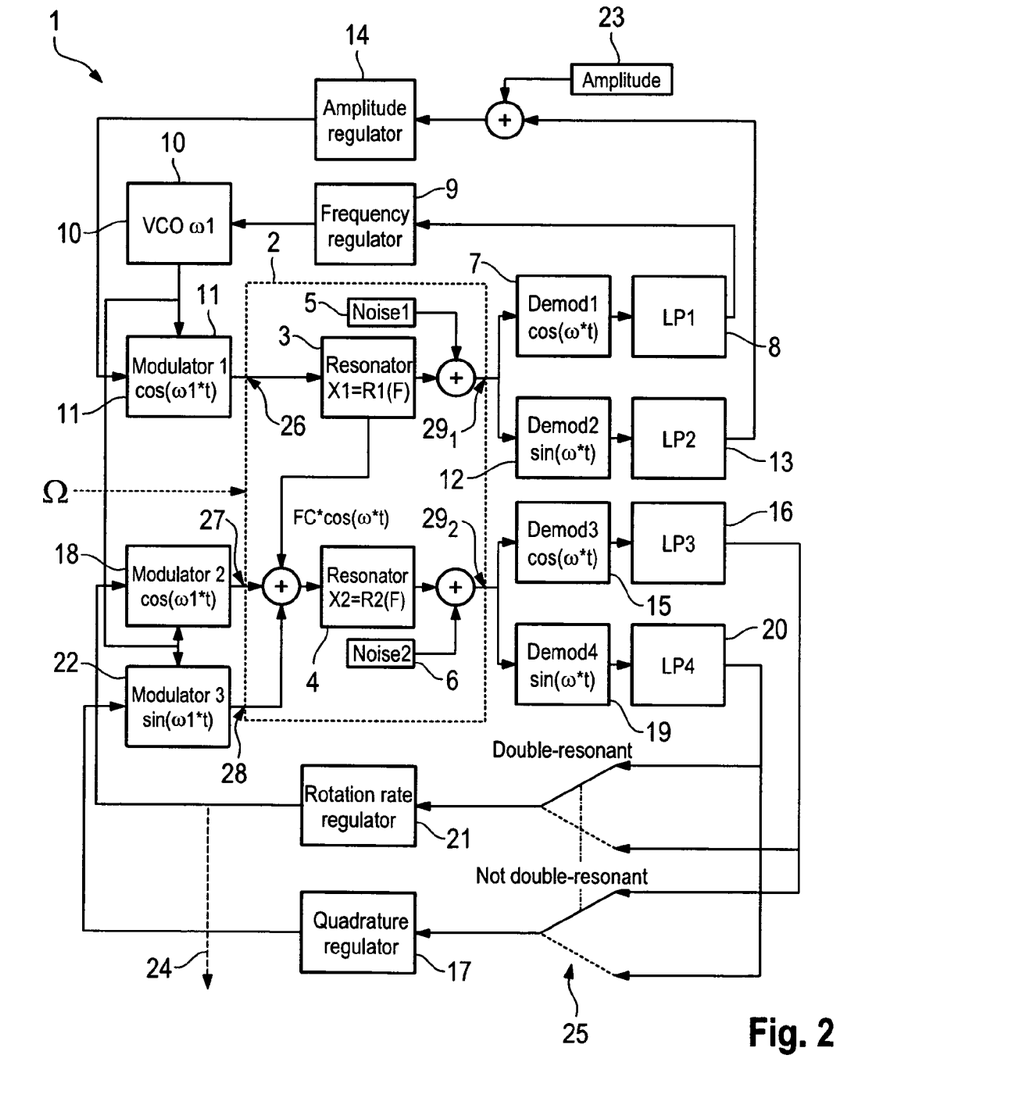
FIG. 2 is a schematic diagram of a conventional Coriolis gyro in accordance with the prior art.

The Coriolis gyro 1 includes four control loops. A first control loop controls the stimulation oscillation (i.e. the frequency of the first resonator 3) at a fixed frequency (resonant frequency). It comprises a first demodulator 7, a first low-pass filter 8, a frequency regulator 9, a voltage controlled oscillator ("VCO") 10 and a first modulator 11.

A second control loop controls the stimulation oscillation at a constant amplitude. It comprises a second demodulator 12, a second low-pass filter 13 and an amplitude regulator 14.

Third and fourth control loops are employed to reset forces that stimulate the read oscillation. The third control loop includes a third demodulator 15, a third low-pass filter 16, a quadrature regulator 17 and a second modulator 18 while the fourth control loop comprises a fourth demodulator 19, a fourth low-pass filter 20, a rotation rate regulator 21 and a third modulator 22.

The first resonator 3 is stimulated at resonant frequency $\omega 1$. The resultant stimulation oscillation is tapped off, demodulated in phase by means of the first demodulator 7, and a demodulated signal component is supplied to the first low-pass filter 8 that removes the sum frequencies. (The tapped-off signal is also referred to below as the stimulation oscillation tapped-off signal.) An output signal from the first low-pass filter 8 is applied to a frequency regulator 9 which controls the VCO 10, as a function of the signal supplied to it, such that the in-phase component essentially tends to zero. The VCO 10 passes a signal to the first modulator 11, which controls a force transmitter such that the first resonator 3 has a stimulation force applied to it. When the in-phase component is zero, the first resonator 3 oscillates at its resonant frequency $\omega 1$. (It should be noted that all of the modulators and demodulators are operated on the basis of this resonant frequency $\omega 1$.)

The stimulation oscillation tapped-off signal is also supplied to the second control loop and demodulated by the second demodulator 12. The output of the second demodulator 12 is passed to the second low-pass filter 13, whose output signal is, in turn, applied to the amplitude regulator 14. The amplitude regulator 14 controls the first modulator 11 in response to this signal and the output of a nominal amplitude transmitter 23 to cause the first resonator 3 to oscillate at a constant amplitude (i.e. the stimulation oscillation has constant amplitude).

As mentioned above, movement/rotation of the Coriolis gyro 1 results in Coriolis forces (indicated by the term $FC \cdot \cos(\omega 1 \cdot t)$ in the drawing) that couple the first resonator 3 to the second resonator 4, stimulating the second resonator 4 to oscillate. A resultant read oscillation of frequency $\omega 1$ is tapped off, and a corresponding read oscillation tapped-off signal (read signal) is supplied to both the third and fourth control loops. This signal is demodulated in the third control loop by the third demodulator 15. Sum frequencies are removed by the third low-pass filter 16 and the low-pass-filtered signal is supplied to the quadrature regulator 17. The output of the regulator 17 is applied to the third modulator 22 so that corresponding quadrature components of the read oscillation are reset. Analogously, the read oscillation tapped-off signal is demodulated by the fourth demodulator 19 in the fourth control loop. It passes through the fourth low-pass filter 20, and the low-pass-filtered signal is applied to the rotation rate regulator 21 (whose output signal is proportional to the instantaneous rotation rate) and passed as the rotation rate measurement result to a rotation rate output 24. On the other hand, it is passed to the second modulator 18, which resets the corresponding rotation rate components of the read oscillation.

A Coriolis gyro 1 as described above may be operated in both double-resonant and non-double-resonant versions. When operated in a double-resonant form, the frequency $\omega 2$ of the read oscillation is approximately equal to the frequency $\omega 1$ of the stimulation oscillation. In contrast, in the non-double-resonant case, the frequency $\omega 2$ of the read oscillation differs from the frequency $\omega 1$ of the stimulation oscillation. In double resonance, the output signal from the fourth low-pass filter 20 contains corresponding information about the rotation rate. In the non-double-resonant case, in contrast, the output signal from the third low-pass filter 16 contains this information. A doubling switch 25 is provided to switch between the different operating modes of double resonance/non-double resonance. The switch 25 selectively connects the outputs of the third and of the fourth low-pass filter 16, 20, selectively to the rotation rate regulator 21 and to the quadrature regulator 17.

The design of a Coriolis gyro as described above, in particular that of the evaluation/control electronics, offers the advantages of relatively high rotation rate sensitivity coupled with the simple mechanical structure of the resonator 2. A disadvantage of the arrangement is its high complexity in terms of the electronic components of the evaluation/control electronics. A plurality of digital/analog converters is required in the embodiment of the Coriolis gyro of FIG. 2 (e.g., at the points 26, 27 and 28). They are expensive and require a large amount of electrical power. The digital/analog converters frequently require a number of supply voltages and are difficult to integrate with other electronic components (in particular, digital components) restricting miniaturization. Furthermore, at least two analog/digital converters must be used in the embodiment of the Coriolis gyro shown in FIG. 2 (at the points $29_1$ and $29_2$).

SUMMARY AND OBJECTS OF THE INVENTION

It is therefore an object of the invention to provide an operating method for a double-resonance Coriolis gyro that requires as few electronic components as possible (in particular analog/digital converters and digital/analog converters) whereby they can be produced with low-cost and large-scale-miniaturized evaluation/control electronics.

The present invention addresses the preceding object by providing, in a first aspect, an operating method for a Coriolis gyro. Digital read signals are produced that represent a measure of the instantaneous amplitudes/frequencies (or other parameters) of the stimulation oscillation/read oscillation of the resonator of the Coriolis gyro. Force signals are applied to the resonator that are controlled as a function of the digital read signals so that the stimulation oscillation/read oscillation assume specific amplitudes/frequencies (or other desired parameter values).

In a second aspect, the invention provides evaluation/control electronics for use in a Coriolis gyro. Such electronics includes a unit for production of digital read signals that represent a measure of the instantaneous amplitudes/frequencies (or other parameters) of the stimulation oscillation/read oscillation of the resonator.

At least one control loop is provided for producing force signals as a function of the digital read signals. Such force signals are passed to the resonator and are controlled such that the stimulation oscillation/read oscillation assume desired amplitudes/frequencies (or other parameter values).

A pulse modulator is provided that is a part of the control loop. Digital stimulation/compensation signals are fed to the modulator that are derived from the digital read signals so that the force signals can be produced from quantized output signals from the pulse modulator.

In a third aspect, the invention provides a pulse modulator for conversion of a complex input signal to a pulsed signal. Such modulator has a subtraction stage that produces a control error signal from the difference between the complex input signal and a feedback signal. A signal conversion stage converts the control error signal to a control signal.

A first multiplication stage multiplies the control signal by a complex mixing signal oscillating at the frequency $\omega_0$. It produces at least one of the real and imaginary parts of a control signal up-mixed by $\omega_0$.

A quantization stage quantizes at least one of the real and imaginary parts of the control signal up-mixed by $\omega_0$ and thus produces the pulsed signal. A feedback unit uses the pulsed signal to produce the feedback signal for the subtraction stage.

The preceding and other features of the invention will become further apparent from the detailed description that follows. Such description is accompanied by a set of drawing figures. Numerals of the drawing figures, corresponding to those of the written description, point to the features of the invention with like numerals referring to like features throughout both the written description and the drawings.

DETAILED DESCRIPTION OF THE PREFERRED EMBODIMENT

Figure 1:
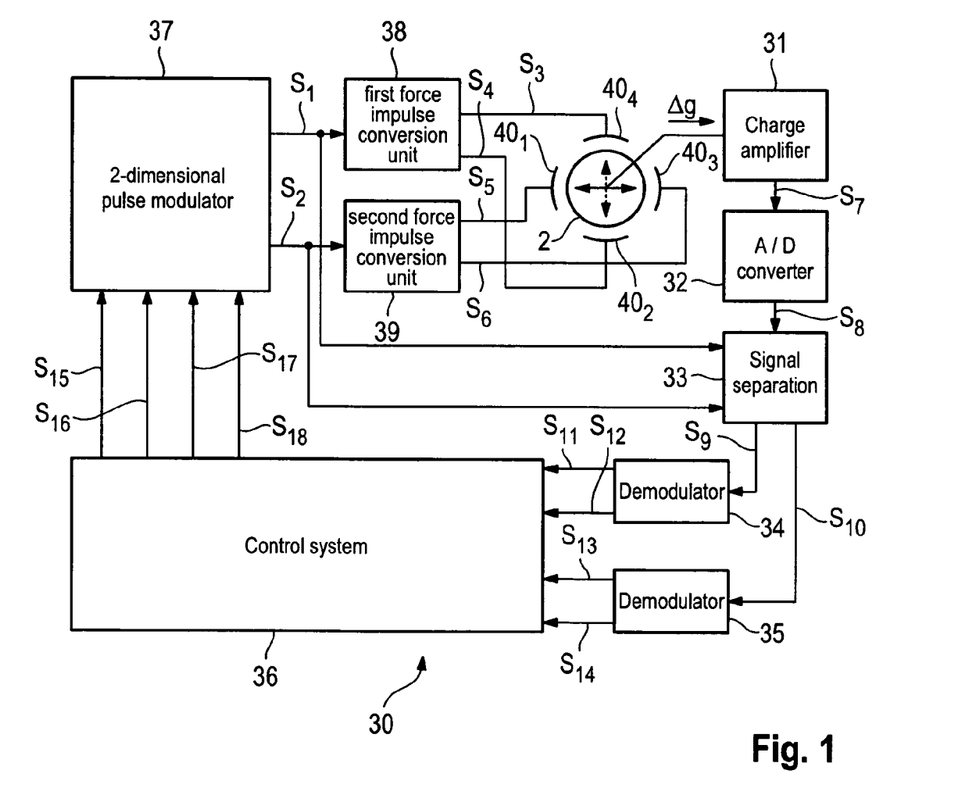
FIG. 1 is a schematic diagram of evaluation/control electronics in accordance with the invention.

FIG. 1 is a schematic diagram of evaluation/control electronics 30 in accordance with the invention. It includes a charge amplifier 31, an analog/digital converter 32, signal separation 33, a first demodulator 34, a second demodulator 35, a control system 36, a two-dimensional pulse modulator 37, a first and a second force impulse conversion unit 38, 39 and a first to fourth force transmitter electrode $40_1$ to $40_4$. The assembly of the components identified by the reference numbers 31 to 40 forms two control loops, one for setting the amplitudes/frequencies of the stimulation oscillation, and the other for setting the amplitudes/frequencies of the read oscillation.

As can be seen, the circuit of the invention has a single analog/digital converter 32 and no digital/analog converters. The functions of digital/analog converters are performed by the combination of the two-dimensional pulse modulator 37 and the two force impulse conversion units 38, 39.

The method of operation of the evaluation/control electronics is explained below. The two-dimensional pulse modulator 37 produces first and second ternary-quantized output signals $S_1$, $S_2$, with the signal $S_1$ converted in the first force impulse conversion unit 38 to force impulse signals (voltage signals) $S_3$ and $S_4$ to set the amplitudes/frequencies of the stimulation oscillation/read oscillation of the resonator 2. Correspondingly, the second ternary-quantized output signal $S_2$ is converted by the second force impulse conversion unit 39 to force impulse-signals (voltage signals). $S_5$, $S_6$. The ternary-quantized output signals $S_1$, $S_2$ can preferably each assume the values 1, 0 and −1.

Should the signal $S_1$ have the value +1, then the first force impulse conversion unit 38 uses $S_1$ to produce two force input signals $S_3$ and $S_4$ that, in turn, cause a force impulse. The force impulse signals $S_3$ and $S_4$ produce electromagnetic fields between the second and the fourth of the force transmitter electrodes $40_2$, $40_4$ and between the force transmitter electrodes $40_2$, $40_4$ and the resonator 2. Such electromagnetic fields produce force impulses. Should the value of the signal $S_1$ be −1, the force impulse signals $S_3$ and $S_4$ are produced whereby the lines of force of the resultant electromagnetic fields run in the opposite direction to those in the situation $S_1=1$. Should the value of $S_1$ be zero, no electrical field exists between the second and fourth force transmitter electrodes $40_2$, $40_4$ or between the force transmitter electrodes $40_2$, $40_4$ and the resonator 2. Thus the following potentials (0 or $U_0$) are applied to the second and fourth force transmitter electrodes $40_2$, $40_4$ in accordance with the following:

| $S_1$ | $40_4$ | $40_2$ |
|---|---|---|
| −1 | 0 | $U_0$ |
| 0 | 0 | 0 |
| 1 | $U_0$ | 0 |

Corresponding considerations apply to the second ternary-quantized output signal $S_2$. This signal is converted by the second force impulse conversion unit 39 to fifth and sixth force impulse signals $S_5$, $S_6$, that are applied to the first and the third force transmitter electrodes $40_1$, $40_3$. The stimulation oscillation parameters are set/controlled by the force transmitter electrodes $40_2$, $40_4$, and the read oscillation parameters are set/controlled by the force transmitter electrodes $40_1$, $40_3$.

In addition to stimulation of the resonator 2, the application of electrical fields to the force transmitter electrodes $40_1$, $40_4$ also results in the flow of electrical charge to a moving center electrode. This charge is measured by the charge amplifier 31. A corresponding analog output signal $S_7$ is converted by the analog/digital converter 32 to a corresponding digital signal $S_8$. The signal separation 33 produces a first digital read signal $S_9$ and a second digital read signal $S_{10}$ from the signal $S_8$. Since the charge that has flowed to the center electrode is dependent on the capacitances of the force transmitter electrodes $40_1$, $40_4$ (to which an electrical field is applied at that time), the amount of charge that has flowed is a measure of the amplitudes/frequencies/other parameters of the stimulation oscillation/read oscillation of the resonator 2. The instantaneous movement/change in the movement of the resonator 2 can thus be reconstructed by the signal separation 33 as a function of the instantaneous and/or older output signal values of the ternary-quantized output signals $S_1$, $S_2$.

The two-dimensional pulse modulator 37 is designed so that the ternary-quantized output signals $S_1$ and $S_2$ never change at the same time. This results from the fact that, in general, the charge flowing to the center electrode is measured in sum form (i.e. charge movements that result from a superimposition of two electrical fields can only be measured as one entity and is not possible to associate parts of the charge movement with individual electrical fields). The additional condition between the ternary-quantized output signals $S_1$ and $S_2$ makes it possible to obtain an unambiguous association between the charge that has flowed and a specific electrical field. Thus it is possible to distinguish precisely between the stimulation oscillation and the read oscillation. A further possible condition is that only one of the two signals $S_{1\,and\,S2}$ may assume values other than zero at a specific time.

The first digital read signal $S_9$ is demodulated by the first demodulator 34 into a real part $S_{11}$ and an imaginary part $S_{12}$. Analogously, the second digital read signal $S_{10}$ is demodulated by the second demodulator 35 into a real part $S_{13}$ and an imaginary part $S_{14}$. The first digital read signal $S_9$ may contain, for example, information about the stimulation oscillation while the second digital read signal $S_{10}$ contains information about the stimulation oscillation. The real and imaginary parts $S_{11}$ to $S_{14}$ of the first and second digital read signals $S_9$, $S_{10}$ are applied to the control system 36 that produces stimulation/compensation signals $S_{15}$ to $S_{18}$ in response. The signal $S_{15}$ might, for example, represent the real part of the digital stimulation/compensation signal for the stimulation oscillation, and the signal $S_{16}$ its imaginary part. In contrast, the signal $S_{17}$ might represent the real part of a digital stimulation/compensation signal for the read oscillation while the signal $S_{18}$ represents its imaginary part. The digital stimulation/compensation signals $S_{15}$ to $S_{18}$ are applied to the two-dimensional pulse modulator 37 that employs them to produce the ternary-quantized output signals $S_1$, $S_2$.

Figure 3:
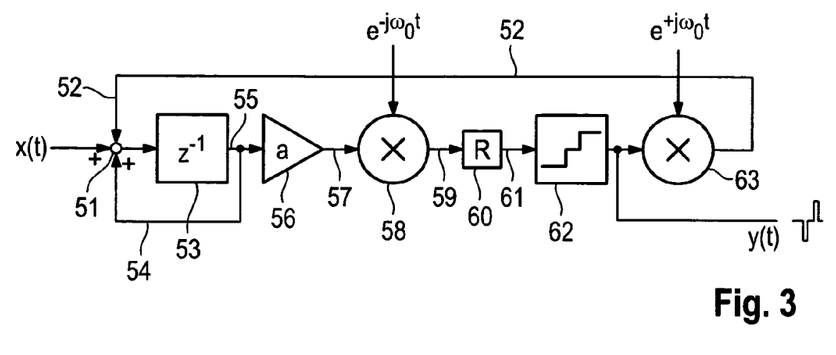
FIG. 3 is a block diagram of a pulse modulator in accordance with the invention.

FIG. 3 is a block diagram of a pulse modulator in accordance with the invention in complex form. A complex input signal x(t) includes a real and imaginary parts, each represented as digital values. A complex feedback signal 52 is subtracted from the complex input signal x(t) in the addition node 51, with their difference representing the control error. The (likewise complex) content of a delay element 53 is added to such difference at the addition node 51. (The content of the delay element 53 is passed via a signal line 54 to the addition node 51.) The delay element 53, combined with the signal line 54, forms a complex integrator stage that integrates the complex control error (i.e. the difference between the input signal and the feedback signal). The integrated signal 55 is amplified by a factor "a" in an amplifier stage 56. An amplified signal 57 is passed to a first multiplication stage 58 where it is multiplied by the complex mixing signal exp(−j$\omega_o$t) to obtain a signal 59 up-mixed to frequency $\omega_0$. A block 60 determines the real part 61 of the complex up-mixed signal 59 and this is applied to a quantizer 62.

The quantizer 62 of the embodiment of FIG. 3 is in the form of a ternary quantizer that converts the input signal to the three possible values −1, 0, +1 of a pulsed signal with the aid of comparators. The quantized pulsed signal y(t) thus produced can be tapped off at the output of the quantizer 62. The real pulsed signal y(t) is multiplied in a second multiplication stage 63 by the complex-conjugate mixing signal exp(−j$\omega_o$t) to produce the complex feedback signal 52. The complex feedback signal 52, obtained by multiplication of a real and a complex number, is passed to the addition node 51 at the input to the circuit.

The sequence of functional units illustrated in FIG. 3 can be implemented by means of a digital signal processor (DSP) or by dedicated hardware. The digital signal processing must be carried out at a sampling frequency $\omega_A$ that is considerably higher than the frequency $\omega_0$ of the complex mixing signal (e.g. 2 to 1000 times the mixing frequency $\omega_0$ may be used as the sampling rate $\omega_A$).

Figure 4:
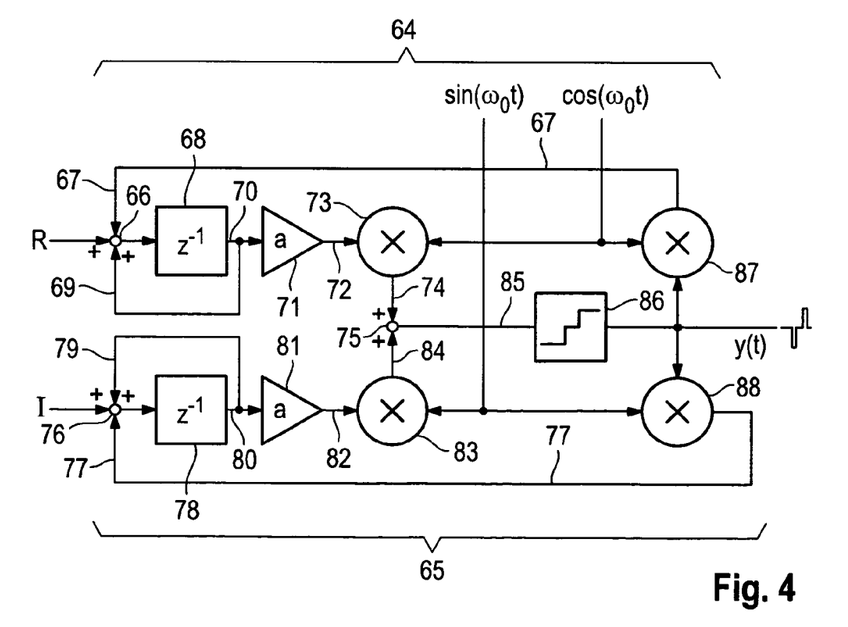
FIG. 4 is a block diagram of a pulse modulator with the in-phase and quadrature paths shown separately.

FIG. 4 is a block diagram of the pulse modulator of FIG. 3, with the in-phase signal path and the quadrature signal path shown separately. The upper half of FIG. 4 shows the in-phase signal path 64, which processes the real part R of the input signal x(t). The lower half of FIG. 4 shows the quadrature signal path 65 for processing the imaginary part I of the input signal. The real part of the control error is determined at the addition node 66 of the in-phase path as the difference between the real part R of the input signal and the real part 67 of the feedback signal. The integrator value, stored in a delay element 68, is added to this control error and passed via a signal line 69 to the addition node 66. The signal line 69, combined with the delay element 68, form an integrator with the transfer function $H(z)=1/(1-z^{-1})$.

The addition of the real part of the control error to the previous integrator value produces a new integrator value that is once again stored in the delay element 68. The integrated signal 70 in the in-phase signal path is scaled by the factor "a" of an amplifier 71, and is then passed as an amplified signal 72 to a first multiplier 73. The first multiplier 73 multiplies the real, amplified signal 72 by the real signal $\cos(\omega_0 t)$, (i.e. by the real part of $\exp(-j\omega_o t)$). The first multiplier 73 determines the product $R\cdot\cos(\omega_0 t)$, which is supplied as a signal 74 to an adder 75.

The quadrature signal path 65 of the pulse modulator includes an addition node 76 in which the difference between the imaginary part I of the input signal and an imaginary part 77 of the feedback signal is calculated. This difference, which corresponds to the imaginary part of the control error, is added to the previous content of a delay element 78 that is passed to the addition node 76 via a signal line 79. The new value, which is obtained as the sum of the previous value and the imaginary part of the control error, is written to the delay element 78. Together with the signal line 79, the delay element 78 forms an integrator with the transfer function $H(z)=1/(1-z^{-1})$. The integrated signal 80 from the quadrature signal path is produced at the output of the integrator, and is scaled by the factor "a" of an amplifier 81. An amplified signal 82 obtained in this way is then multiplied by the signal $\sin(\omega_0 t)$ in a second multiplier 83. The product $I\cdot\sin(\omega_0 t)$ obtained in this way is supplied as a signal 84 to the adder 75. The adder 75 adds the signals $R\cdot\cos(\omega_0 t)$ and $I\cdot\sin(\omega_0 t)$ and produces the signal $R\cdot\cos(\omega_0 t)+I\cdot\sin(\omega_0 t)$ as a signal 85. The signal 85 corresponds precisely to the real part of the up-mixed signal as the complex multiplication of x(t) and $\exp(-j\omega_o t)$ shows:

$$x(t)\cdot\exp(-j\omega_o t) = (R+j\cdot I)\cdot(\cos(\omega_0 t)-j\cdot\sin(\omega_0 t)) =$$
$$= [R\cdot\cos(\omega_0 t)+I\cdot\sin(\omega_0 t)] +$$
$$j\cdot[I\cdot\cos(\omega_0 t)-R\cdot\sin(\omega_0 t)]$$

The real part of this signal is $R\cdot\cos(\omega_0 t)+I\cdot\sin(\omega_0 t)$. The signal 85 thus represents the real part of the complex up-mixed signal, and, to such extent, corresponds to the signal 61 illustrated in FIG. 3.

The digital real signal 85 is applied to a quantizer 86 that converts it to the quantized pulsed signal y(t). The three-stage (ternary) quantizer of FIGS. 3 and 4 quantizes the input signal on the basis $y(t)\in\{-1;0;+1\}$. For this, the quantizer 86 includes comparators that continuously compare the level of the signal 85 with predetermined threshold values. Depending on the result of such comparisons, the output signal y(t) is assigned one of the values −1; 0; +1 in each case as the current signal value. Instead of three-stage (ternary) quantization, other desired quantizations may be employed depending on the purpose (e.g. two-stage (binary) or multiple-stage quantizations).

The real part 67 and the imaginary part 77 of the complex feedback signal are derived from the quantized pulsed signal y(t). For this, the pulsed signal y(t) is multiplied by the complex-conjugate mixing signal $\exp(-j\omega_o t)$:

$$y(t)\cdot\exp(-j\omega_o t)=y(t)\cdot\cos(\omega_0 t)+j\cdot y(t)\cdot\sin(\omega_0 t)$$

The real part $y(t)\cdot\cos(\omega_0 t)$ of the complex feedback signal is produced by the third multiplier 87 that multiplies the pulsed signal y(t) by $\cos(\omega_0 t)$. The real part 67 of the feedback signal is thus produced at the output of the third multiplier 87 and fed back to the addition node 66. In order to produce the imaginary part $y(t)\cdot\sin(\omega_0 t)$ of the complex feedback signal, the pulsed signal y(t) is multiplied by $\sin(\omega_0 t)$ at the fourth multiplier 88. The imaginary part 77 of the feedback signal is produced at the output of the fourth multiplier 88 and fed back to the addition node 76.

Integrators are provided on the input side in the exemplary embodiments of FIGS. 3 and 4 that integrate the control error existing between the input signal and the feedback signal to produce an integrated signal. The transfer function H(z) of an integrator can be represented as $H(z)=1/(1-z^{-1})$. Other signal conversion stages (with other transfer functions H(z)) may be employed on the input side rather than the integrators. For example, higher-order transfer functions H(z) may be used in which case, however:

$$\lim H(z)=\infty z\to 1.$$

The transfer function H(z) should thus tend to infinity as the frequency $\omega$ tends to zero ($z\to 1$). The additional free parameters of H(z) may be used to optimize specific characteristics of the modulator (for e.g. signal-to-noise ratio) or of the overall system.

Figure 5:
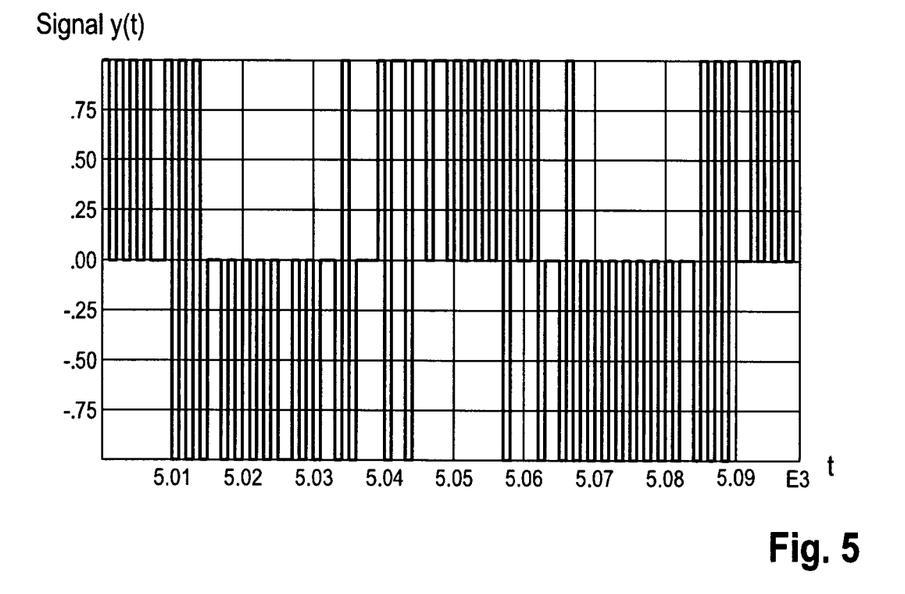
FIG. 5 illustrates a ternary-quantized pulsed signal y(t)

FIG. 5 illustrates the waveform of the pulsed signal y(t) that can be tapped off at the output of the quantizer for ternary quantization with $y(t)\in\{-1;0;+1\}$ determined by computer simulation. The real part R of the complex input signal was set to 0.3, while the imaginary part I of the input signal was set to zero. The input signal x(t) is thus constant and does not vary with time. The sampling frequency $\omega_A$ was set five times the mixing frequency $\omega_0/\omega_A=0.2$. Clock pulses at the sampling frequency $\omega_A$ are shown on the abscissa, numbered successively from 5000 to 5100. During each clock cycle, the pulsed signal y(t) assumes one of the three possible values −1; 0; +1. The value of y(t) during one specific clock cycle at the sampling frequency is plotted on the ordinate.

Figure 6:
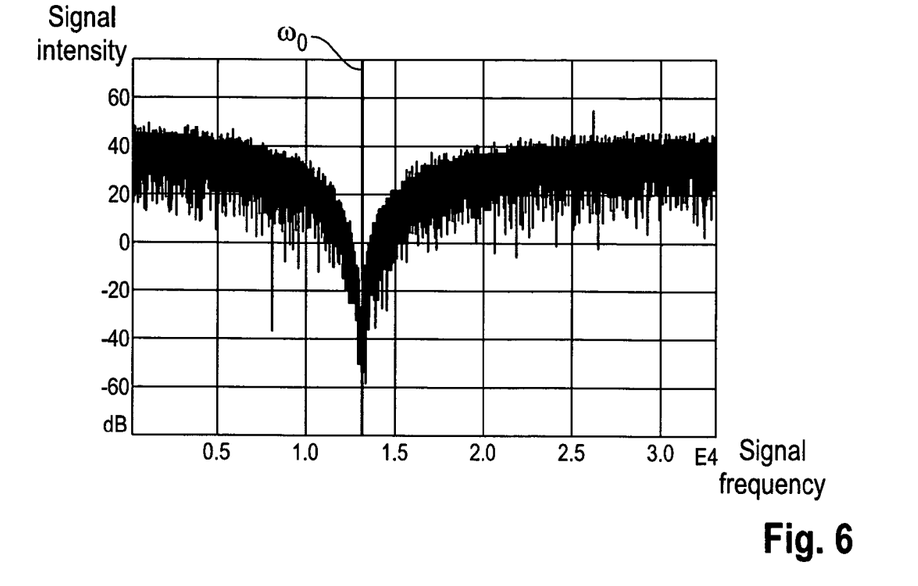
FIG. 6 is a graph of the frequency spectrum of the pulsed signal y(t) produced at the output of the quantizer.

FIG. 6 is a graph of the spectrum of the pulsed signal of FIG. 5 from a spectral analysis (FFT). The frequencies of the spectral components are shown in arbitrary FFT units on the abscissa while signal intensity is plotted in dB on the ordinate. A peak can be seen in the spectral distribution at frequency $\omega_0$. It can also be seen that the noise level in the vicinity of $\omega_0$ is considerably less than in the remaining part of the spectrum. In a conventional sigma-delta modulator, the noise level would, in contrast, be considerably reduced at low frequencies (i.e. in the vicinity of $\omega_0$). In a pulse modulator in accordance with the invention, the integrated and amplified signal is up-mixed to the mixing frequency $\omega_0$ by a complex multiplication. As a result, the spectral range over which the noise is reduced is also shifted toward the mixing frequency $\omega_0$, resulting in the noise characteristic of the graph of FIG. 6.

The pulse modulator of the invention may be used for digital synthesis of a pulsed signal. In this case, the main spectral component of the pulsed signal can be predetermined by the mixing frequency $\omega_0$. The phase angle of the pulsed signal produced can be set exactly by the ratio of the real to the imaginary part of the input signal. This results in a pulsed signal whose phase is stable.

When using a pulse modulator in accordance with the invention for frequency synthesis, the pulsed signal y(t)

should be filtered by means of an electrical bandpass filter, whose passband is centered around the frequency $\omega_0$. Such a filter which may, for example, be in the form of a crystal or ceramic filter, makes it possible to suppress spectral ranges further removed from $\omega_0$ where the noise level is undesirably high. A bandpass filter such as this makes it possible to significantly improve the signal-to-noise ratio.

Figure 7:
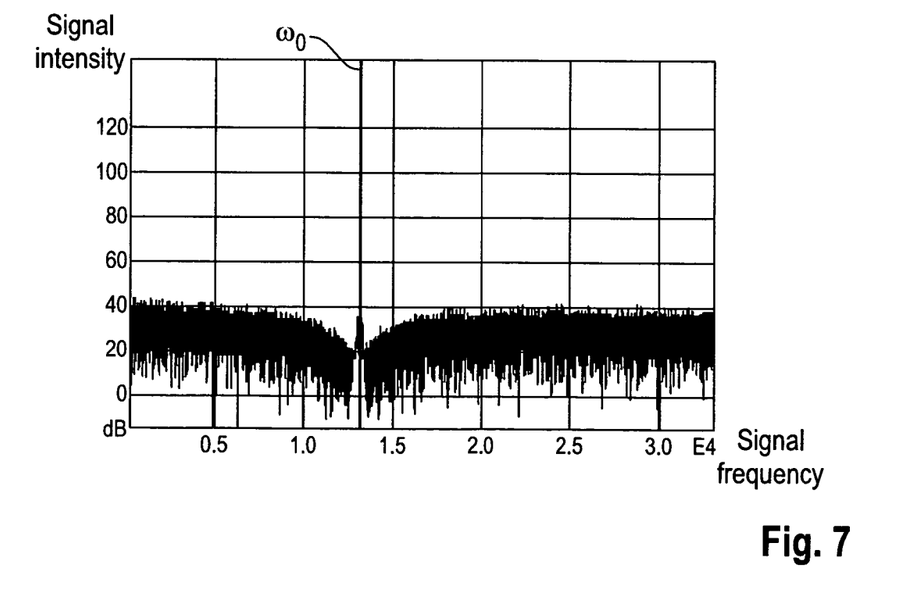
FIG. 7 is a graph of the frequency spectrum of the signal of the preceding figure after filtering by a micromechanical oscillator.

The pulse modulator of the invention is suitable, inter alia, for stimulation of electromechanical oscillators to carry out harmonic oscillations. In particular, the electrostatic forces required for oscillation stimulation can be produced by a ternary-quantized pulsed signal applied to the stimulation electrodes of a micromechanical resonator. The frequency $\omega_0$ of the pulsed signal y(t) is preferably chosen to be equal to the resonant frequency of the micromechanical oscillator in this case. If the pulsed signal, as illustrated in FIGS. 5 and 6, is used for harmonic stimulation of a high Q-factor oscillator (e.g., with a Q-factor of $10^4$), whose resonant frequency corresponds to the stimulation frequency $\omega_0$, the majority of the quantization noise is filtered out by the oscillator. That is, the quantization noise in spectral ranges further removed from the resonant frequency $\omega_0$ is suppressed by the oscillator itself. The filtered spectrum obtained in this way is illustrated by the graph of FIG. 7.

Figure 8:
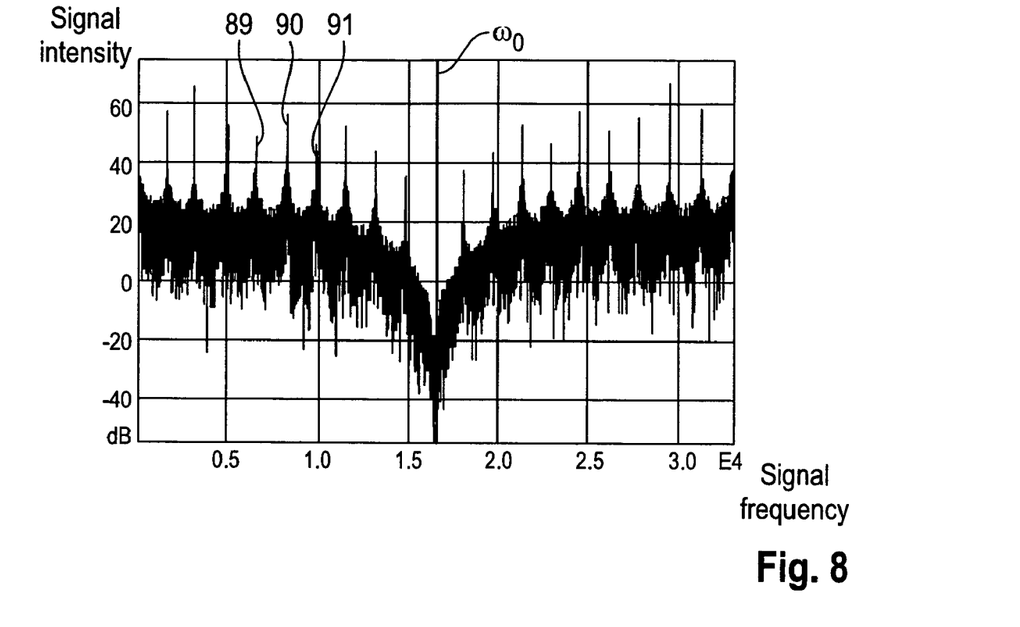
FIG. 8 is a graph of the frequency spectrum of a pulsed signal y(t) plotted for a ratio of the mixing frequency to the sampling frequency of $\omega_0/\omega_A=0.25$.

Specific ratios of the frequencies $\omega_0/\omega_A$ exist that result in conversion of the noise-like quantization product in y(t) to a series of more or less periodic functions. An example is illustrated in FIG. 8, a graph of the frequency spectrum obtained for the ratio $\omega_0/\omega_A=0.25$. A range of spectral lines 89, 90, 91, etc. can be seen in addition to the peak at $\omega_0$. Such spectral lines result from the fact that the quantizer is a highly non-linear element in the control loop. This stimulates relaxation oscillations in the control loop with certain frequency ratios. Such control loop response is recognized to exist in conventional delta-sigma converters.

Figure 9:
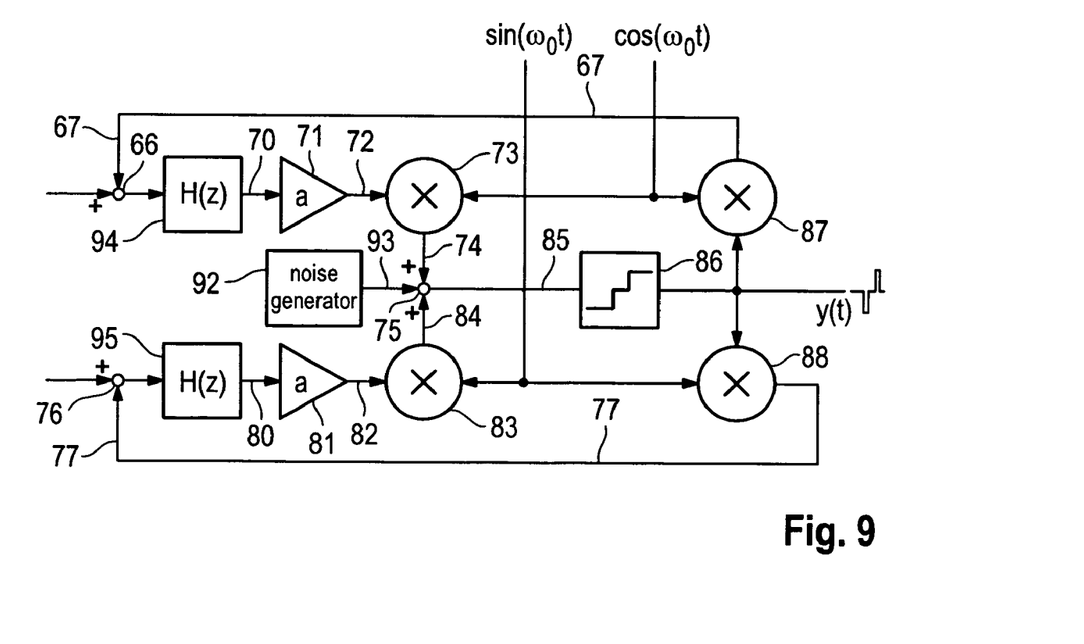
FIG. 9 is a block diagram of a pulse modulator with statistical rounding.
Figure 10:
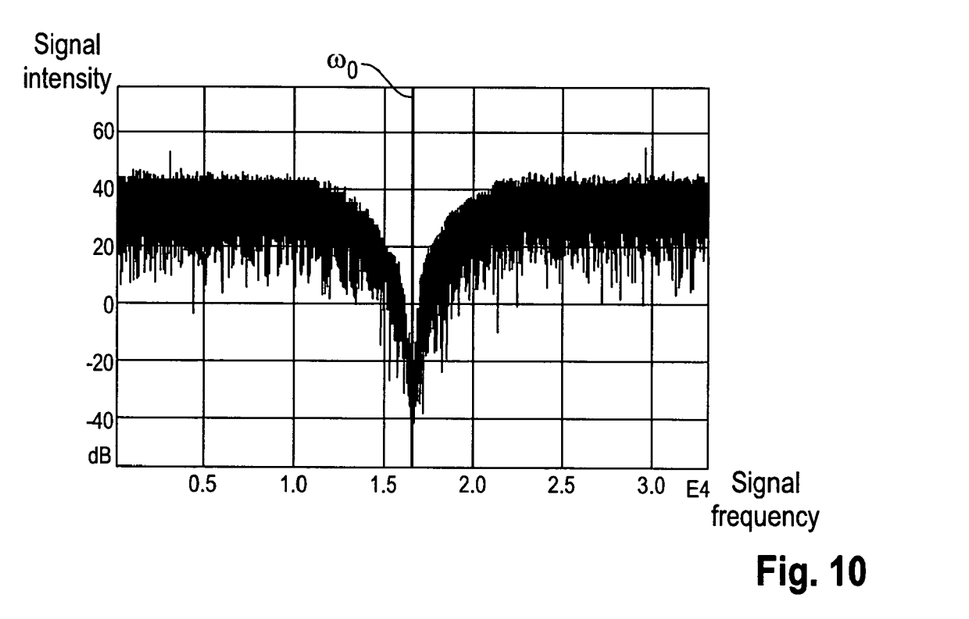
FIG. 10 is a graph of the frequency spectrum of FIG. 8 with statistical rounding.

The central linearity of the quantizer can be improved by adding a noise signal to the input signal to prevent the creation of relaxation oscillations. A spectrally uniformly distributed noise signal is preferably employed for this purpose. FIG. 9 is a block diagram of a correspondingly modified pulse modulator. In comparison to the block diagram of FIG. 4, the pulse modulator of FIG. 9 additionally comprises a noise generator 92 that produces a noise signal 93. Also, the integrators shown in FIG. 4 are illustrated in a generalized form as signal conversion stages 94, 95 with transfer function H(z). Otherwise, the assemblies of FIG. 9 correspond to the elements of the block diagram of FIG. 4. The noise signal 93 is supplied to the adder 75, where it is added to the signals 74 and 84. The signal 85 at the input of the quantizer 86 thus has a noise signal superimposed on it. This eventually leads to statistical rounding in the quantization process. The graph of FIG. 10 illustrates the frequency spectrum of a pulsed signal y(t) produced with the aid of a pulse modulator modified as shown in FIG. 9. Although the frequency ratio $\omega_0/\omega_A$ is once again equal to 0.25, no relaxation oscillations are formed.

The pulse modulator of the invention can be used, in particular, for electrostatic stimulation of micromechanical oscillators. For such purpose, by way of example, a ternary-quantized pulsed signal of the type shown in FIG. 5 can be connected to the stimulation electrodes of a micromechanical resonator. The pulsed signal of FIG. 5 represents a sinusoidal signal of frequency $\omega_0$. Such a pulsed signal can be used to stimulate a micromechanical resonator to carry out harmonic oscillations at the frequency $\omega_0$. This is particularly true when the frequency $\omega_0$ of the pulsed signal corresponds (at least approximately) to the resonant frequency of the oscillator.

Resonators that can oscillate in two mutually perpendicular directions $y_1$ and $y_2$ are employed in rotation rate sensors and Coriolis gyros. The two-dimensional pulse modulator illustrated in FIG. 11 may be employed for electrostatic stimulation of a two degree of freedom resonator. The two-dimensional pulse modulator has a first pulse modulator 96, that produces the pulsed signal $y_1(t)$ from the complex input signal $R_1, I_1$. The pulsed signal is used to stimulate the resonator in the $y_1$ direction. The pulsed signal $y_2(t)$ is produced from the complex input signal $R_2, I_2$ by a second pulse modulator 97. This pulsed signal is employed to stimulate the oscillator to oscillate in the $y_2$ direction. Both the first pulse modulator 96 and the second pulse modulator 97 are of the type of a pulse modulator with statistical rounding as shown in FIG. 9. A description of the design and method of operation of the first and second pulse modulators 96, 97 can thus be found in the portion of the description relating to FIGS. 4 and 9. However, the two-dimensional pulse modulator of FIG. 11 includes a 2D quantizer 98 that is shared by the two channels. It converts the signal 99 of the first pulse modulator 96 to the quantized pulsed signal $y_1(t)$ and transforms the signal 100 of the second pulse modulator 97 to the quantized pulsed signal $y_2(t)$.

Figure 11:
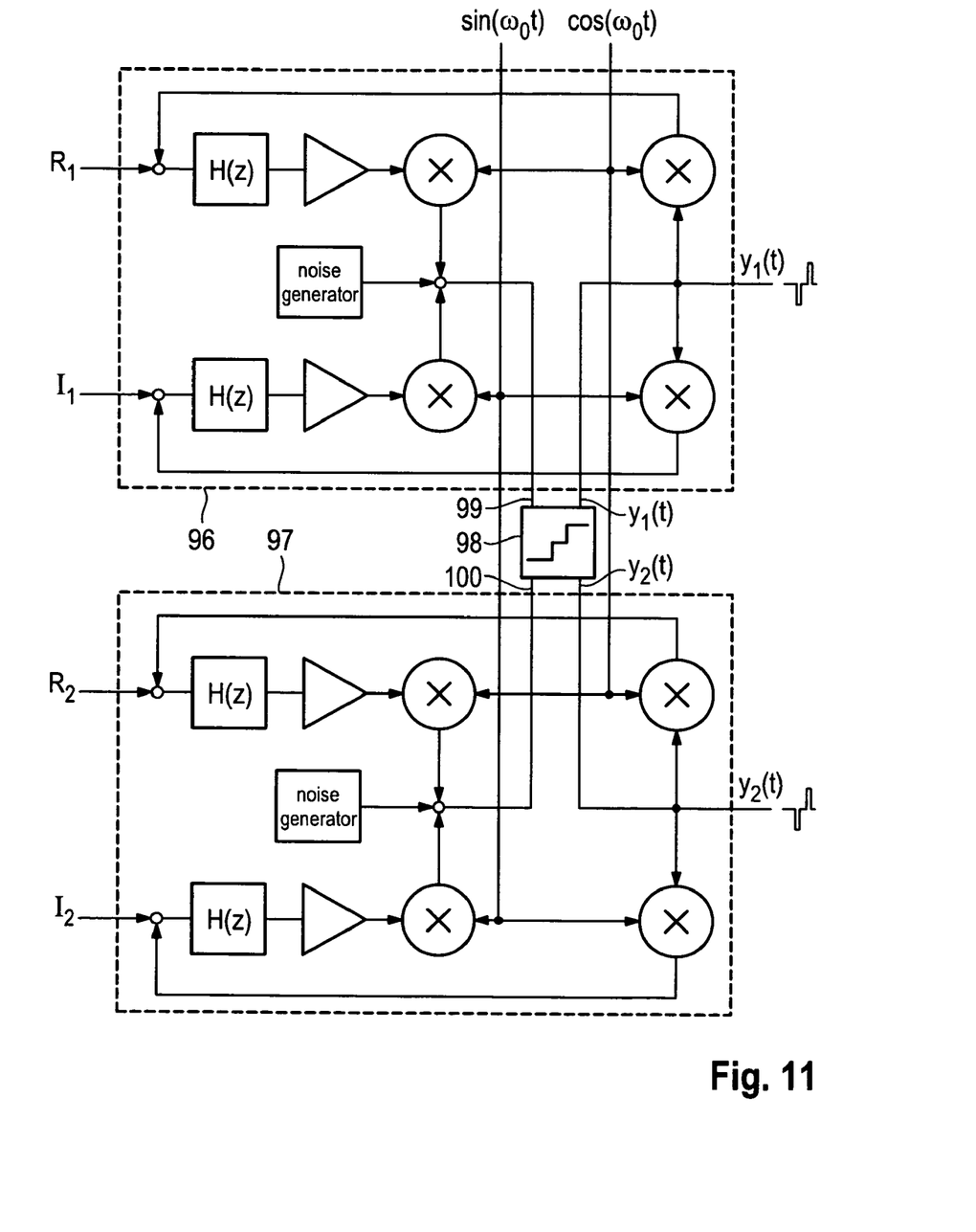
FIG. 11 is a block diagram of a two-dimensional pulse modulator.

The use of a 2D quantizer 98 shared by the two channels makes it possible to take into account additional conditions advantageous for operation of the micromechanical sensor during quantization of the signals 99, 100. One such additional condition, for example, is that in each case only one of the channels may produce pulses other than zero. Another feasible additional condition is that only one of the output signals $y_1(t)$, $y_2(t)$ may change in each case at any given time. Additional conditions may be worthwhile when the displacement currents applied to the electrodes of a double resonator are measured in sum form, making it possible to deduce the deflection of the oscillator. The additional conditions make it possible to associate a displacement current unambiguously with one specific electrode. This makes it possible to carry out signal separation between the signals caused by the $y_1$ and $y_2$ deflections of the oscillator.

All of the embodiments of the pulse modulator according to the invention that have been described above can be used to carry out the method according to the invention. If required, they may be combined with one another. The pulse modulator (two-dimensional) described in FIG. 11 can be adopted "directly", and it is also possible to use combinations of two one-dimensional pulse modulators. It is also possible to dispense with the additional noise signal.

One major aspect of the invention is that the force signals are produced from quantized output signals from a pulse modulator fed with digital stimulation/compensation signals derived from the digital read signals.

The method according to the invention can be applied equally well to Coriolis gyros which are double-resonant, non-double-resonant, in the form of an open-loop system or a closed-loop system.

According to the invention, the digital/analog converters are replaced by a pulse modulator. The output signals from the pulse modulator are preferably ternary-quantized as ternary quantization is particularly advantageous for a double electrode architecture of electrostatic force transmitter such as those used for a double-resonant Coriolis gyro.

The pulse modulator can optionally be designed such that the two ternary-quantized output signals $S_1, S_2$ from the pulse modulator can each assume the values $\{-1, 0, +1\}$, which are digitally coded in some suitable manner. The output signals are converted to suitable electrical voltage pulses and are applied to corresponding stationary electrodes, so that either a "negative" force ($S_1=-1$) no force ($S_1=0$) or a "positive" force ($S_1=+1$) is exerted on the moving electrode structure of the Coriolis gyro (moving masses and resetting springs). An analogous situation applies to the output signal $S_2$.

The digital read signals are preferably produced in such a way that an amount of electrical charge which flows to a moving electrode (center electrode) on the basis of the oscillation of the resonator is measured by means of a charge amplifier, a corresponding analog output signal from the charge amplifier is converted to a digital output signal, and the digital read signals are determined from the digital output signal from the charge amplifier via signal separation, as a function of instantaneous and/or older, ternary-quantized output signal values from the pulse modulator. The digital read signals therefore cannot be obtained on their own from the digital output signal from the charge amplifier, and information is also required which is contained in the ternary-quantized output signals from the pulse modulator. The expression "center electrode" in this case means the inner, moving electrode structure of the Coriolis gyro, comprising the moving masses which can be caused to oscillate, and corresponding resetting springs, or at least parts thereof.

The digital read signals are in each case subdivided in the normal manner by means of a demodulation process into a normal component and a quadrature component. Normal and quadrature components of the digital stimulation/compensation signals are then produced by means of a control process from the normal and quadrature components of the digital read signals, and are fed to the pulse modulator. The digital stimulation/compensation signals are controlled such that the desired parameter values are set for the stimulation oscillation/read oscillation.

The operation of a pulse modulator in accordance with the invention represents an advantageous modification of a conventional sigma-delta converter. It has been explained for the example of an input signal that is kept constant without any restriction to generality. The subtraction and signal conversion stages convert the input signal to a control signal that also varies only slightly in time. In contrast to conventional sigma-delta converters, the control signal is, however, now multiplied by the first multiplication stage by a complex mixing signal at the frequency $\omega_0$ to produce a control signal up-mixed to the frequency $\omega_0$. The real or the imaginary part of the control signal, oscillating at the frequency $\omega_0$, is then quantized by the quantization stage, resulting in a real pulsed signal with a dominant frequency component at the frequency $\omega_0$ at the output of the quantization stage. The real pulsed signal, together with the aid of positive or negative pulses, simulates a sinusoidal signal at the frequency $\omega_0$. Such pulsed signal represents the point of origin for the calculation of the feedback signal at the same time. Such feedback signal is fed back to the subtraction stage where it is subtracted from the input signal to determine the control error.

It is not absolutely essential to calculate both the real part and the imaginary part of the control signal up-mixed by $\omega_0$ to produce the pulsed signal. If the intention is to derive the pulsed signal from the real part of the up-mixed control signal, the imaginary part of the up-mixed control signal need not necessarily be produced.

The major advantage of the pulse modulator of the invention over conventional sigma-delta modulators is that the range of low quantization noise is shifted from the vicinity of $\omega=0$ toward the operating frequency $\omega_0$. This is achieved by complex up-mixing of the control signal in the first multiplication stage. It results in a pulsed signal that has a low noise level in the relevant spectral range around $\omega_0$.

The starting point for understanding the noise characteristic is that the signal conversion stage which may be formed, for example, by an integrator, has a low-pass characteristic. This means that relatively high-frequency components are partially suppressed by the signal conversion stage. In conventional sigma-delta converters, this suppression of the higher-frequency components in the control loop causes a rise in the quantization noise at higher frequencies. In contrast, the quantization noise in the low-frequency range is low. In the case of the pulse modulator of the invention, the control signal, which can be tapped off at the output of the signal conversion stage, is up-mixed to the frequency $\omega_0$ by multiplication by the complex mixing signal at the frequency $\omega_0$. The range of low quantization noise is thus also shifted from the frequency $\omega=0$ toward the mixing frequency $\omega_0$, even though the signal conversion stage on the input side is still processing a signal which has not been up-mixed. This results in a pulsed signal with a noise level which is low in the vicinity of $\omega_0$.

The pulse modulator according to the invention can be implemented at low cost, requires relatively little electrical power, and can easily be integrated together with the digital electronics.

It is advantageous for the pulse modulator to have an in-phase signal path for processing of the real part of the input signal, as well as a quadrature signal path for processing of the imaginary part of the input signal. It is also advantageous for the control error signal, the control signal and the feedback signal to be complex signals with each having a real signal component as well as an imaginary signal component. To insure that the real pulsed signal reflects the real or the imaginary part of the control signal up-mixed by $\omega$ in the correct phase, the subtraction stage, the signal conversion stage, the first multiplication stage and the feedback unit are complex signal processing units which have an in-phase signal path and a quadrature signal path only the real part (or the imaginary part) of the output signal from the first multiplication stage is required to derive the real pulsed signal from it with the aid of the quantization stage. The quantization stage may thus be a real processing stage. In fact, the real pulsed signal is then once again converted to a complex feedback signal in the feedback unit. This design of the pulse modulator makes it possible to synthesize a real pulsed signal, which reproduces a harmonic oscillation at the frequency $\omega_0$ with low phase and amplitude noise, with the correct phase.

According to one advantageous embodiment of the invention, the signal conversion stage has an integrator stage that integrates the control error signal and produces an integrated signal as the control signal. Integration of the control error signal makes it possible to slave the (complex) integrated signal continuously to the complex input signal. Since an integrator stage has a low-pass filter characteristic, this results in a control signal at the output of the integrator stage with a reduced noise level in the region around $\omega_0$. If this control signal is then up-mixed by the first multiplication stage, and then quantized, a pulsed signal with the desired noise characteristic results.

It is advantageous for the integrator stage to have a first integrator for the in-phase signal path and a second integrator for the quadrature signal path. The first integrator integrates the real part of the control error signal and the second integrator integrates the imaginary part of the control error signal. A complex integrator stage for the complex control error signal can be produced with the aid of two separate integrators in this way.

It is advantageous for the signal conversion stage to have an amplifier stage. The gain factor is chosen such that the quantizer receives the correct input signal level in this case.

According to a further advantageous embodiment of the invention, the first multiplication stage has a first multiplier for the in-phase signal path and a second multiplier for the quadrature signal path. The first multiplier multiplies the real part of the control signal by the real part of the complex mixing signal oscillating at the frequency $\omega_0$, and thus produces a first result signal. The second multiplier multiplies the imaginary part of the control signal by the imaginary part of the complex mixing signal oscillating at the frequency $\omega_0$, and thus produces a second result signal. According to a further advantageous embodiment, the pulse modulator has an adder that adds the first result signal from the first multiplier and the second result signal from the second multiplier to form a sum signal to determine the real part of the up-mixed control signal.

If it is assumed that the complex control signal is in the form $R+j\cdot I$, and, by way of example, the complex mixing signal is represented in the form $\exp(-j\omega_o t)$, then the first result signal from the first multiplier becomes $R\cdot\cos(\omega_0 t)$. The second result signal from the second multiplier assumes the form $I\cdot\sin(\omega_0 t)$, and the adder produces the signal $R\cdot\cos(\omega_0 t)+I\cdot\sin(\omega_0 t)$ as the sum signal. However, this signal corresponds precisely to the real part of $(R+j\cdot I)\cdot\exp(-j\omega_o t)$. The real part of the complex multiplication of the control signal and mixing signal can thus be determined by the first multiplier, the second multiplier and the adder.

According to an advantageous embodiment of the invention, the sum signal produced by the adder is then quantized by the quantization stage to produce the real pulsed signal. In this case, it is advantageous for a noise level to be added to the input signal to the quantization stage. The pulse modulator is clocked at a sampling frequency $\omega_A$ that must be considerably higher than the mixing frequency $\omega_0$. Certain ratios of $\omega_0$ to $\omega_A$ result in relaxation oscillations being formed in the pulse modulator. These can be seen as additional peaks in the frequency spectrum of the pulsed signal. Since a noise signal is added to the input signal to the quantizer, the result of the quantization process is statistically rounded. This trick makes it possible to prevent the formation of relaxation oscillations.

The quantization stage preferably carries out binary or ternary quantization of its respective input signal. In the case of binary quantization, the pulsed signal may assume only the values 0 and 1. A pulsed signal is thus produced that contains only positive voltage pulses. A ternary-quantized pulsed signal may assume the values −1, 0, 1. A pulsed signal such as this comprises both positive and negative voltage pulses. Ternary quantization is carried out whenever a pulsed signal is required with both positive and negative pulses.

The feedback unit preferably has a second multiplication stage, that multiplies the pulsed signal by a complex-conjugate mixing signal oscillating at the frequency $\omega_0$. It thus produces the feedback signal down-mixed by $\omega_0$ for the subtractor. The pulsed signal is produced by quantization of the real part of the up-mixed control signal, and thus has its dominant frequency component at the frequency $\omega_0$. Before the pulsed signal can be used as a feedback signal, it must be down-mixed again to baseband. For this purpose, the pulsed signal is multiplied by a complex-conjugate mixing signal at the frequency $\omega_0$ to obtain a down-mixed complex feedback signal.

The second multiplication stage preferably has a third multiplier for production of the real part of the feedback signal and a fourth multiplier for production of the imaginary part of the feedback signal. The third multiplier multiplies the pulsed signal by the real part of the complex-conjugate mixing signal oscillating at the frequency $\omega_0$. The fourth multiplier multiplies the pulsed signal by the imaginary part of the complex-conjugate mixing signal at the frequency $\omega_0$. To shift that frequency component of the pulsed signal at the frequency $\omega_0$ in the correct direction, the multiplication of the pulsed signal by the mixing signal must be carried out in complex form. The pulsed signal $y(t)$ is a real signal, while the complex-conjugate mixing signal can be represented in the form $\exp(-j\omega_o t)$. The complex multiplication thus produces a complex feedback signal with the real part $y(t)\cdot\cos(\omega_0 t)$ and the imaginary part $y(t)\cdot\sin(\omega_0 t)$.

The pulse modulator is preferably operated at a sampling frequency $\omega_A$ which is 2 to 1000 times higher than the mixing frequency $\omega_0$. This is necessary to satisfy the Nyquist condition for the up-mixed signals.

According to a further advantageous embodiment, the pulse modulator is implemented with the aid of a digital signal processor (DSP). All of the operations which are required for operation of the pulse modulator can be programmed with the aid of signal processing routines.

The drive circuit according to the invention for a micromechanical resonator has at least one pulse modulator of the type described above. The pulsed signal produced by the at least one pulse modulator is preferably used for electrostatic oscillation stimulation of the resonator. The pulsed signal produced can be directly connected to the stimulation electrodes of the resonator. In this case, it is advantageous for the mixing frequency $\omega_0$ of the pulse modulator to correspond to one resonant frequency of the resonator, as this then insures effective stimulation of the oscillator.

A frequency generator in accordance with the invention for synthesis of a pulsed signal at a predetermined frequency with a predetermined phase has at least one pulse modulator of the type described above. The pulse modulator according to the invention can be used to produce a corresponding pulsed signal $y(t)$ at a predetermined frequency with a predetermined phase. In this case, the phase angle of the pulsed signal produced can be predetermined very precisely by the ratio of the real part to the imaginary part of the input signal $x(t)$. The pulsed signal produced has a low noise level in the vicinity of $\omega_0$.

According to a further advantageous embodiment, the pulse modulator is followed by a bandpass filter, preferably a crystal or ceramic filter. This downstream bandpass filter allows those frequency components remote from $\omega_0$ and in which the noise level is high to be filtered out.

While the invention has been described with reference to its presently-preferred embodiment, it is not limited thereto. Rather, the invention is limited only insofar as it is defined by the following set of claims and includes within its scope all equivalents thereof.

What is claimed is:

1. An operating method for a Coriolis gyro in which
digital read signals are produced, which represent a measure of the instantaneous amplitudes/frequencies of a stimulation oscillation/read oscillation of a resonator of the Coriolis gyro, and force signals are applied to the resonator, with the force signals being controlled as a function of the digital read signals such that the stimulation oscillation/read oscillation assume specific amplitudes/frequencies, the force signals are produced from quantized output signals from a pulse modulator which is fed with digital stimulation/compensation signals which are derived from the digital read signals characterized in that the quantized output signals are pulse sequences at a constant frequency.

2. A method as claimed in claim 1, characterized in that the output signals from the pulse modulator are ternary-quantized.

3. The method as claimed in claim 2, characterized in that the pulse modulator produces a first and a second output signal which are each ternary-quantized, with the first output signal being transformed to a first sequence of ternary-quantized force pulses, and the second output signal being transformed to a second sequence of ternary-quantized force pulses ($S_5$, $S_6$), with the first sequence of force pulses being that part of the force signals which is used for setting desired amplitudes/frequencies of the stimulation oscillation, and the second sequence of force pulses being that part of the force signals which is used for setting desired amplitudes/frequencies of the read oscillation.

4. The method as claimed in one of the preceding claims, characterized in that the digital read signals are produced in such a way that
- an amount of electrical charge which flows to a moving center electrode on the basis of electrical fields which are produced by the force signals is measured by means of a charge amplifier,
- a corresponding analog output signal from the charge amplifier is converted to a digital output signal, and
- the digital read signals are determined from the output signal from the charge amplifier via signal separation, as a function of instantaneous output signal values from the pulse modulator.

5. The method as claimed in claim 4, characterized in that the digital read signals are in each case subdivided by means of a demodulation process into a normal and a quadrature component.

6. The method as claimed in claim 5, characterized in that normal and quadrature components of the digital stimulation/compensation signals are produced by means of a control process from the normal and quadrature components of the digital read signals and are fed to the pulse modulator.

7. Evaluation/control electronics for use in a Coriolis gyro, having:
- a unit for production of digital read signals which represent a measure of the instantaneous amplitudes/frequencies of a stimulation oscillation/read oscillation of a resonator of the Coriolis gyro,
- at least one control loop by means of which force signals are produced as a function of the digital read signals and are passed to the resonator, with the force signals being controlled such that the stimulation oscillation/read oscillation assume specific amplitudes/frequencies,
- a pulse modulator which is a part of the control loop and which is fed with digital stimulation/compensation signals which are derived from the digital read signals, in which case the force signals can be produced from quantized output signals from the pulse modulator, characterized in that the quantized output signals are pulse sequences at a constant frequency.

8. A pulse modulator for conversion of a digital complex input signal to a pulsed signal, comprising
- a subtraction stage which produces a control error signal from a difference between a digital complex input signal and a feedback signal;
- a signal conversion stage with a transfer function tending to infinity when a frequency of the control error signal tends to the value zero, which converts the control error signal to a control signal;
- a first multiplication stage, which multiplies the control signal by a complex mixing signal oscillating at a frequency $\omega_0$, and thus produces at least one of a real part and an imaginary part of a control signal up-mixed by $\omega_0$;
- a quantization stage, which quantizes the real part or the imaginary part of the control signal up-mixed by $\omega_0$ and thus produces the pulsed signal;
- a feedback unit, which uses the pulsed signal to produce the feedback signal for the subtraction stage; and
- the subtraction stage, the signal conversion stage, the first multiplication stage and the feedback unit have an in-phase signal path and a quadrature signal path.

* * * * *